Patented Apr. 19, 1927.

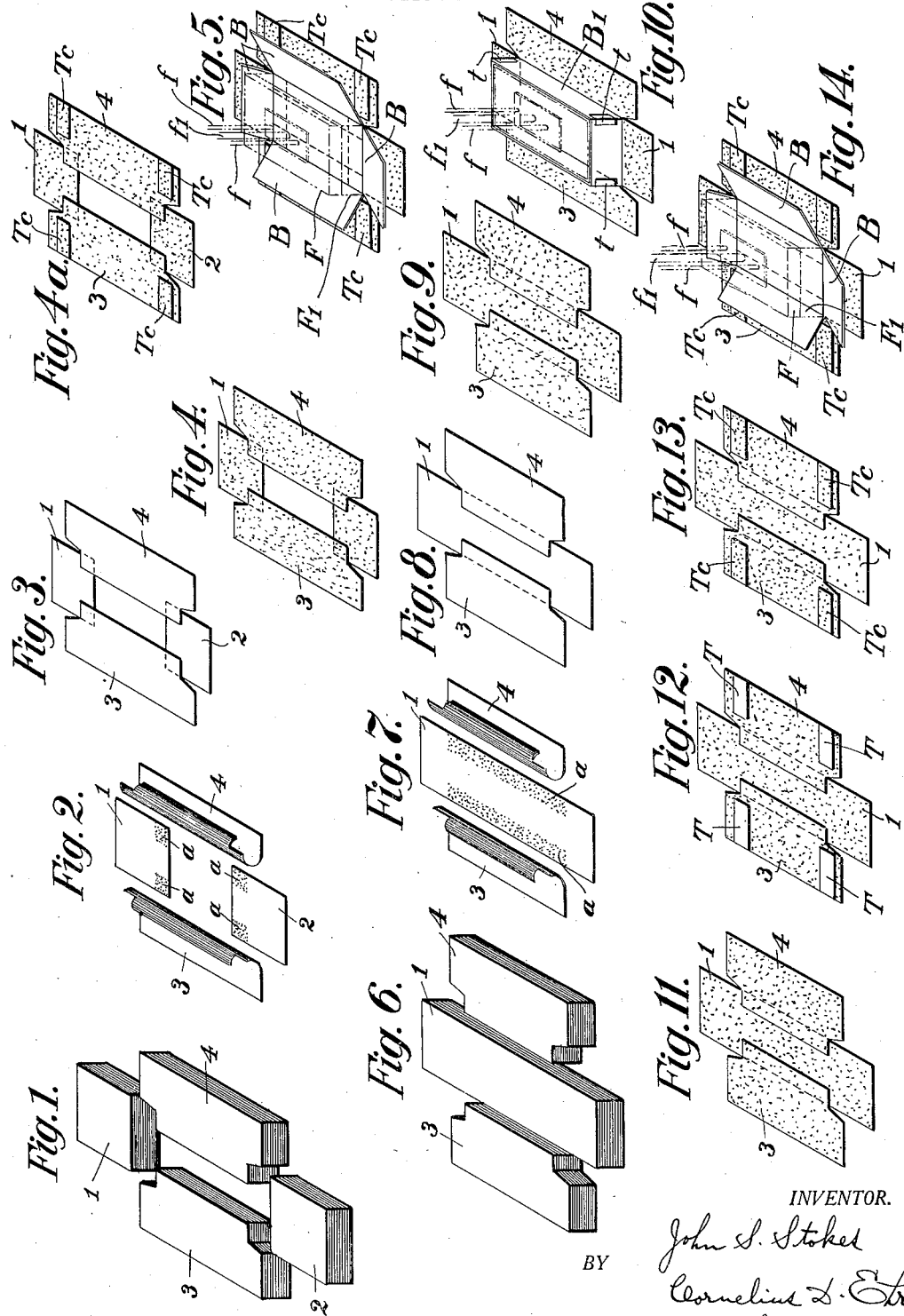

1,625,577

UNITED STATES PATENT OFFICE.

JOHN S. STOKES, OF HUNTINGTON VALLEY, PENNSYLVANIA, ASSIGNOR TO STOKES AND SMITH COMPANY, OF PHILADELPHIA, PENNSYLVANIA, A CORPORATION OF PENNSYLVANIA.

METHOD OF ASSEMBLING, TABBING, AND APPLYING COMPOSITE BOX WRAPPERS.

Application filed February 18, 1926. Serial No. 89,127.

My invention relates to the art of applying composite wrappers, and particularly tabbed composite wrappers, to cartons, containers, and particularly to boxes, and especially to unstayed boxes, all generically hereinafter termed boxes.

In accordance with my invention a composite wrapper, of the general character disclosed by myself and another in Letters Patent No. 1,265,273, May 7, 1918, is produced by securing to each other by adhesive the several wrapper elements or components, and, before the adhesive dries, sets or hardens, the composite wrapper is applied by adhesive to a box; my method is accordingly characterized by the fact that from the time the wrapper components are first manipulated or brought to positions for the first application of adhesive to the time the composite wrapper is applied to a box, the operations are substantially continuous, in the sense that there are no substantial delays, and particularly the composite wrapper is not laid aside or is not stored for subsequent application to a box.

Further in accordance with my invention the components of a wrapper may be first coated with adhesive throughout their box-engaging sides, and thereafter secured to each other, and, before the adhesive dries, hardens or sets the wrapper is applied to a box.

Further in accordance with my invention after the formation of the composite wrapper, there are performed, in either sequence, the steps of applying adhesive to the box-engaging face of the composite wrapper and applying tabs to the composite wrapper or to one or more components thereof; and thereafter the tabbed wrapper is applied to a box before drying, setting or hardening of the adhesive which secures to each other the wrapper components; or, after formation of the composite wrapper, there may be performed, in any sequence, or two of them simultaneously, the three steps of applying adhesive to the box-engaging face of the composite wrapper, applying tabs to the composite wrapper or to one or more components thereof, and applying adhesive to the box-engaging faces of the tabs, and thereafter the tabbed composite wrapper is applied to a box before drying, hardening or setting of the adhesive which secures the wrapper components to each other.

Further in accordance with my invention, before the wrapper components are secured to each other, tabs may be applied to one or more of them, the box-engaging faces of the tabs having a coat of adhesive applied before or after the tabs are applied to the components; or there may be performed, in either sequence, the operations of applying adhesive to the box-engaging faces of the components and applying tabs to one or more of the components, and thereafter the components may be secured to each other to form a composite wrapper having its box-engaging face coated with adhesive and having the tabs adhering thereto, the box-engaging faces of the tabs being uncoated or having a coating of adhesive applied before the tabs are applied to the wrapper components, all in preparation for subsequent application of the composite wrapper and tabs to a box; or, before the wrapper components are secured to each other there may be performed, in any sequence, or two of them simultaneously; the three operations of applying adhesive to the box-engaging faces of the components, applying tabs to one or more of the components, and applying adhesive to the box engaging faces of the tabs, whereafter the wrapper components may be secured to each other, thereby forming a composite tabbed wrapper with the box-engaging faces of the wrapper and of the tabs coated with adhesive in preparation for application to a box.

Of the modes of procedure above and hereinafter indicated it is characteristic that from the time the wrapper elements or components are first operated upon to the application of the composite wrapper, tabbed or not, to the box, unstayed or stayed, the several steps closely follow each other, whereby the operations of forming the composite wrapper, coating it with adhesive, and applying it to the box are continuously carried on in closely successive steps, in any of the sequences noted, with departure from prior practice in that the composite wrapper is not laid aside nor stored, but is substantially immediately applied to a box after its formation and application thereto of suitable adhesive.

My invention resides in a method of producing composite wrappers and applying them to boxes, in a method of producing composite wrappers and particularly tabbed composite wrappers, and in a composite wrapper and tabbed composite wrapper, all of the character hereinafter described and claimed.

For an understanding of my invention, and for an illustration of the various ways of practicing my method and the various forms of tabbed composite wrappers reference is to be had to the accompanying drawing, in perspective, in which:

Fig. 1 illustrates stacks of wrapper components.

Fig. 2 illustrates in a later stage the application of adhesive to wrapper components.

Fig. 3 represents a composite wrapper.

Fig. 4 represents a composite wrapper having its box-engaging faces coated with adhesive.

Fig. 4a represents a tabbed composite wrapper, the box-engaging faces of whose components and tabs are coated with adhesive.

Fig. 5 represents an unstayed box blank and a coated tabbed composite wrapper in register with each other and in position with respect to form-block structure for beginning the operations of simultaneously wrapping and staying the box blank.

Fig. 6 represents stacks of wrapper components of modified form.

Fig. 7 represents a later stage operation in which adhesive is applied to a component.

Fig. 8 represents a composite wrapper.

Fig. 9 represents the composite wrapper coated with adhesive.

Fig. 10 represents the coated composite wrapper in register with a stayed box in association with form-block structure for applying the wrapper to the box.

Fig. 11 is a coated composite wrapper of the character shown in Fig. 10.

Fig. 12 shows the wrapper of Fig. 11 in a later stage in which tabs are applied.

Fig. 13 shows the tabbed composite wrapper of Fig. 12 in a later stage in which adhesive is applied to the box-engaging faces of the tabs.

Fig. 14 represents the tabbed wrapper of Fig. 13 in register with an unstayed box blank in association with form-block structure for simultaneously wrapping and staying the box blank.

Heretofore, in the preparation of composite wrappers, for example as described in the aforesaid Letters Patent No. 1,265,273, to suitable of the wrapper components is locally applied adhesive by which the wrapper components are secured to each other to form the composite wrapper, the adhesive being allowed to dry, set or harden and the wrappers then laid away or stacked in storage, thereafter to be coated with adhesive and applied to a box. In accordance with my invention, however, this practice is departed from, by performing substantially continuously, several operations from first manipulation of the wrapper components to the time the composite wrapper is applied to the box, in the sense that there are no substantial delays and that the composite wrappers are not laid aside or stored for subsequent application to a box.

My invention is further contrasted from the aforesaid prior practice, in that the composite wrapper coated with adhesive before, or, and preferably, after the components are attached to each other with adhesive, is applied to the box substantially immediately or before the adhesive which secures the components to each other dries, sets or hardens.

In prior practice the double thickness of the paper or other material where the components overlap causes unevenness and unwieldiness of a pack or stack of composite wrappers in the hopper or on an elevating table of an automatic adhesive-applying machine thereby introducing difficulties in feeding the composite wrappers from the stack in succession to the machine. In addition composite blanks, and particularly those comprising four or more components, are difficult to handle either in stacks or singly. By my method these difficulties are overcome and the additional operator attending the machine which assembles the components into composite wrappers is dispensed with, and the additional floor space required by such machine is saved; and the laying aside or storage of the composite blanks is avoided.

Preferably in accordance with my invention the aforesaid disadvantages of prior practice are avoided by producing one composite wrapper at a time and substantially immediately passing it onward for application of adhesive to its box-engaging face, and delivering the coated composite wrapper to a wrapping machine, whereby a series of composite wrappers is produced and substantially immediately applied in succession to a series of boxes.

The utilization of composite wrappers effects economy in the paper or other material and permits also the use in each wrapper of components of different characteristics, as to quality and color of the paper or other material or the utilization of one or more printed components, and shrinking of the paper caused by the adhesive or its moisture is prevented or reduced, yielding a better and cheaper box which does not warp and is of improved quality and appearance. In addition to these advantages, my method of substantially immediately applying the composite wrapper to the box after the components are attached to each other, and in substantially continuously performing all the operations from the time the components are first manipulated to the time the composite wrapper is applied to the box reduces the cost of the wrapped box, reduced the number of operators required and the time consumed, and reduces the floor space required for the machinery for practicing my method, when it is not entirely manually practiced.

Referring to the drawing, Fig. 1 shows the wrapper components 1, 2, 3 and 4 in stacks. Either while in or upon their stacks, or by removal to a different position, the several components are brought into a relation such for example as indicated in Fig. 2 where to suitable of the components, as 1 and 2, adhesive is applied in spots or locally as indicated at $a$, while the adjacent edges of the components 3 and 4 are rolled or folded back. Thereafter the components 3 and 4 are again flattened out and brought into engagement with the components 1 and 2, as indicated in Fig. 3, showing the components secured to each other by the adhesive. Thereafter, the box-engaging face of the composite wrapper or of the components is coated with glue or equivalent adhesive to form the coated composite wrapper indicated in Fig. 4.

Or the several components may have their box-engaging faces coated with adhesive, and then attached to each other to form a composite wrapper, again of the character indicated in Fig. 4. However, I prefer the first-mentioned procedure of first securing the components to each other and thereafter applying adhesive to the box-engaging face of the composite wrapper.

In either case, an adhesively coated composite wrapper of the character indicated in Fig. 4 is then applied to a box, substantially immediately, either manually, or by any suitable wrapping mechanism, such, for example, as of the character disclosed in Letters Patent to Smith No. 691,329 or 778,805, or to Federwitz et al. No. 1,541,036. Such mechanism is elementally indicated in Fig. 5, where a composite wrapper is in register with a box, B, which in the example illustrated is an unstayed box. The usual wrapping is then automatically effected by suitable operations accompanying the movements of the form block structure of the wrapping machine indicated in broken lines in Fig. 5 as comprising the usual form blocks F and $F^1$ operated in suitable times relation, as well understood in the art, by the usual rods $f$, $f$ and $f^1$.

The time elapsing between the application of adhesive to wrapper components for attaching them to each other, as indicated in Fig. 2, and the application of the composite wrapper to the box is short, in the sense that there are no great delays, and in the sense that the adhesive applied in the stage indicated in Fig. 2 has not to undesirable degree hardened, set or dried before application of the wrapper to the box.

For applying adhesive to the box-engaging face of the composite wrapper indicated in Fig. 3, it may be passed in succession through an adhesive-applying machine of any suitable character, such, for example, as disclosed in Nitsch et al. application Serial No. 69,249, filed November 16, 1925. For such purpose, the composite wrappers of Fig. 3 may be disposed in a stack upon such apparatus and removed therefrom and passed through the adhesive-applying mechanism in succession. The coated composite wrappers as delivered by such a machine may then be passed in succession, manually, to a box-wrapping machine of the character referred to.

Preferably, however, from the stage indicated in Fig. 3, to and through the box-wrapping operations, composite wrappers of the character shown in Fig. 3 may be provided in a stack upon an adhesive-applying machine or gluing apparatus which applies adhesive to the box-engaging face of the composite wrappers in succession, delivering them in succession to suitable transfer or conveyor mechanism, which in turn delivers them in succession to a box-wrapping machine. Such a system is disclosed, for example, in Federwitz et al. application Serial No. 40,769, filed July 1, 1925, in which the composite wrappers, Fig. 3 hereof, are disposed in a stack in the adhesive coating or gluing machine G of said application Serial No. 40,769, which delivers them, coated, to the conveyer unit C, which in turn delivers them in succession to the wrapping machine W, where, in register with box blanks, they are applied within the time and with the promptness characteristic of my method.

For simultaneous wrapping and staying of an unstayed box, such as indicated in Fig. 5, the wrapper has attached thereto, as by adhesive, tabs $T^c$ having their box-engaging faces coated with adhesive. A tabbed wrapper of this character is indicated in Fig. 5 for application to an unstayed box whose sides and ends are brought into proper position with respect to each other either manually, or automatically by a wrapping machine of the character referred to. The wrapper faces are applied to the box faces and the tabs $T^c$ are applied at and around the box corners, thereby effecting staying of the box at the same time the composite wrapper is applied.

The tabs may be applied to the uncoated composite wrapper, of Fig. 3, by adhesive, and the box-engaging faces of the tabs and of the composite wrapper may then be simultaneously coated with adhesive. Or the box-engaging faces of the tabs may be coated with adhesive before they are applied to the composite wrapper.

Or the tabs may be applied to components of the wrapper before those components are attached or secured to each other, the tabs having adhesive applied to their box-engaging faces before or after they are applied to the wrapper components.

In Figs. 6 to 9, inclusive, there is shown a preparation of the composite wrapper consisting of but three components, 1, 3 and 4. As indicated in Fig. 6, the several components may be disposed in stacks and then brought into the relation indicated in Fig. 7, with the edges of the components 3 and 4 turned back, for application locally to the element 1 of adhesive, as indicated at a, a. Thereafter, the elements 3 and 4 are flattened upon the element 1, yielding the uncoated composite wrapper, as indicated in Fig. 8. Thereafter, it is operated upon in any of the modes indicated in connection with the composite wrapper of Fig. 4. As indicated in Fig. 10, the composite wrapper of this character is disposed in register with a box B¹, which in this example is stayed, in that before application of the wrapper corner tabs or equivalent fastening means t, t have been applied. In this case again, the successive operations follow each other closely, as described in connection with Figs. 1 to 5, inclusive, and particularly the box-wrapping operation is begun or effected before the adhesive a, Fig. 7, to undesired degree sets, hardens or dries. It will be understood also that the operations are preferably performed within the short time indicated by mechanism, in systems generally described in connection with Figs. 1 to 5, inclusive.

The same is true respecting the modification illustrated in Figs. 11 to 14, inclusive, of which Fig. 11 is a coated freshly assembled composite wrapper such as shown in Fig. 9. To its coated surface are applied tabs T, shown uncoated, which may have their box-engaging faces coated before application to the composite wrapper in Fig. 12. In Fig. 13 there is shown the application of adhesive to the tabs to constitute the coated tabbed wrappers T⁵, this composite product being effected either by applying adhesive to the box-engaging faces of the tabs T of Fig. 12, or by applying the tabs to an uncoated wrapper, as in Fig. 3 or 8, and thereafter applying adhesive to the box-engaging faces of both tabs and composite wrapper.

In Fig. 14 a freshly prepared tabbed composite wrapper, such as indicated in Fig. 13, is shown in preparation for simultaneously wrapping and staying an unstayed box B in the manner described in connection with Fig. 5.

Tabbed wrappers and the method of preparing tabbed wrappers as above described are disclosed in my co-pending application Serial No. 81,175, filed January 14, 1926. As described in said application, tabs may be applied manually or by any suitable mechanism. And more particularly, in a system of the character herein described, involving the practice of my method by an adhesive-applying machine, conveyer unit and wrapping machine, as disclosed in the aforesaid Federwitz et al. application Serial No. 40,769, the application of tabs to the composite wrapper may be effected during pauses of the conveyer mechanism intervening between gluing and wrapping machines, as described in my aforesaid application Serial No. 81,175.

The adhesive utilized in accordance with my method may be of any suitable character, and may be applied in any state suitable to its nature. Ordinarily, the adhesive, as glue, is applied in plastic, fluid or liquid state suitable for application to or spreading or coating upon the wrapper components, composite wrapper and tabs. My method includes also the application of water or other solvent to the coating of glue or other adhesive previously applied to and dried upon the wrapper, its components or tabs, the application of the solvent rendering the material adhesive at the time suitable for my method. For example, suitable of the wrapper components may have thereon a coat of dry glue or similar adhesive which is moistened and thereby rendered adhesive in securing the wrapper component to each other, and the wrapper is then applied to a box before such adhesive again hardens or dries. My invention comprehends also the utilization of dry or powdered adhesive material upon the wrapper components, composite wrapper or tabs, with application of heat or other agent, with or without the application of pressure, to effect plasticity, adhesion and pliability at the required times, the successive operations being performed, including the application of the composite wrapper to the box, before the adhesive so rendered plastic or pliable again hardens, dries or sets.

For brevity in the appended claims, the term "box" is employed in a generic sense to include open and closed cartons, containers and boxes, and unstayed boxes or box blanks; the term "composite wrapper" is employed in a generic sense to include composite wrappers, composite covering sheets, composite covers or composite labels, consisting of two or more elements or components attached or secured to each other, the components consisting of paper or other suitable material, or some of them of one material and some of another material; the term "tab" is employed generically to include reinforcing elements, strips or sheets of paper, cloth or other suitable material of any suitable form, extent or thickness; the utilization or application of adhesive comprehends the use of material which at the time of utilization or application is adhesive or rendered so; and the term "fluid" as applied to the adhesive or adhesive coatings is employed generically to include the condition of the adhesive, whatever its character, before it sets, hardens or dries.

What I claim is:

1. The method of preparing an adhesively coated composite wrapper, which comprises attaching wrapper elements to each other with adhesive, and while said adhesive is fluid coating the box-engaging face of the composite wrapper with adhesive.

2. The method of preparing a tabbed composite wrapper, which comprises attaching wrapper elements together with adhesive, and before said adhesive sets applying individual tabs to individual wrapper elements.

3. The method of preparing a tabbed composite wrapper, which comprises attaching wrapper elements to each other with adhesive, and before said adhesive sets applying tabs to the composite wrapper.

4. The method of preparing a tabbed composite wrapper, which comprises attaching wrapper elements together with adhesive, before said adhesive sets applying individual tabs to individual wrapper elements, and rendering the box-engaging faces of the tabs adhesive.

5. The method of preparing a tabbed composite wrapper, which comprises attaching wrapper elements to each other with adhesive, before said adhesive sets applying tabs to the composite wrapper, and rendering the box-engaging faces of the tabs adhesive.

6. The method of preparing a tabbed wrapper and applying it to a box, which comprises attaching wrapper elements to each other with adhesive, rendering the box-engaging face of the composite wrapper adhesive, and while said first named adhesive is fluid applying the composite wrapper to a box.

7. The method of preparing a tabbed composite wrapper and applying it to an unstayed box, which comprises attaching wrapper elements to each other with adhesive, before said adhesive sets applying tabs to the wrapper elements, and while said adhesive is fluid adhesively applying the composite wrapper and tabs to an unstayed box to simultaneously wrap and stay the box.

8. The method of preparing a tabbed composite wrapper and applying it to an unstayed box, which comprises attaching wrapper elements to each other with adhesive, before said adhesive sets applying tabs to the composite wrapper, and while said adhesive in fluid adhesively applying the composite wrapper and tabs to an unstayed box to simultaneously wrap and stay the box.

9. The method of preparing a composite wrapper, which comprises, in either sequence, before setting of the adhesive, the steps of adhesively coating the box-engaging faces of the wrapper elements, and adhesively attaching the wrapper elements to each other to form a composite wrapper.

10. The method of preparing a tabbed composite wrapper, which comprises, in any sequence, before setting of the adhesive, the steps of adhesively coating the box-engaging faces of the wrapper elements, adhesively attaching the wrapper elements to each other to form a composite wrapper, applying tabs, and coating the box-engaging faces of the tabs with adhesive.

11. The method of preparing a composite wrapper and applying it to a box, which comprises, in either sequence, before setting of the adhesive, the two steps of adhesively coating the box-engaging faces of the wrapper elements, adhesively attaching the wrapper elements to each other to form a composite wrapper, and thereafter applying the wrapper to a box before setting of the adhesive.

12. The method of preparing a tabbed composite wrapper and applying it to an unstayed box, which comprises, in any sequence, before setting of the adhesive, the steps of adhesively coating the box-engaging faces of the wrapper elements adhesively attaching the wrapper elements to each other to form a composite wrapper, applying tabs, coating the box-engaging faces of the tabs with adhesive, and thereafter, before setting of the adhesive, applying the wrapper and tabs to an unstayed box to simultaneously wrap and stay the box.

13. The method of operating upon wrapper elements and bringing them into register with a box in operative relation with form block structure of box-wrapping mechanism, which comprises, in stages succeeding each other before setting of the adhesive, the two steps, in either sequence, of adhesively coating the box-engaging faces of wrapper elements, and adhesively attaching said elements to each other to form a composite wrapper, and thereafter bringing the adhesively coated composite wrapper into register with a box in operative relation to the form block structure of a box-wrapping mechanism.

14. The method of operating upon wrapper elements and bringing them into register with a box in operative relation with form block structure of box-wrapping mechanism, which comprises, in stages succeeding each other before setting of the adhesive, the steps, in any sequence, of adhesively coating the box-engaging faces of the wrapper elements, adhesively attaching the wrapper elements to each other to form a composite wrapper, applying tabs, coating the box-engaging faces of the tabs with adhesive, and thereafter bringing the adhesively coated tabbed composite wrapper into register with an unstayed box in operative relation to the form block structure of a box-wrapping mechanism.

15. The continuous method of assembling and adhesively coating composite wrappers in succession, which comprises removing from stacks thereof in successive groups the elements of composite wrappers to be assembled in succession, in either sequence adhesively assembling the groups of elements in succession to form a succession of composite wrappers, and applying adhesive to the box-engaging faces of the groups of elements in succession.

16. The continuous method of assembling, tabbing and adhesively coating composite wrappers in succession, which comprises removing from stacks thereof in successive groups the elements of composite wrappers to be assembled in succession, in any sequence adhesively assembling the groups of elements in succession to form a succession of composite wrappers, applying adhesive to the box-engaging faces of the groups of elements in succession, applying tabs to the several groups of elements in succession, and adhesively coating the box-engaging faces of the tabs.

17. The continuous method of preparing composite wrappers and applying them to boxes in succession, which comprises removing from stacks thereof in successive groups the elements of composite wrappers to be assembled in succession, in either sequence adhesively assembling the groups of elements in succession to form a succession of composite wrappers, and applying adhesive to the box-engaging faces of the groups of elements in succession, and applying the composite wrappers in succession to boxes while the element-assembling and adhesive-applying steps are in progress upon following composite wrappers.

18. The continuous method of preparing tabbed composite wrappers and applying them to unstayed boxes in succession, which comprises, an any sequence, adhesively assembling the groups of elements in succession to form a succession of composite wrappers, applying adhesive to the box-engaging faces of the groups of elements in succession, applying tabs to the several groups of elements in succession, and adhesively coating the box-engaging faces of the tabs, and thereafter applying the adhesively coated tabbed composite wrappers in succession to unstayed boxes simultaneously to wrap and stay them while following tabbed composite wrappers are in progress of similar preparation.

19. The method of preparing a tabbed composite wrapper, which comprises attaching wrapper elements to each other with adhesive, and, before said adhesive sets, applying a plurality of individual tabs to an individual wrapper element.

20. The method of preparing a tabbed composite wrapper, which comprises attaching wrapper elements to each other with adhesive, and, before said adhesive sets, applying a plurality of individual tabs to an individual wrapper element, and rendering the box-engaging faces of the tabs adhesive.

JOHN S. STOKES.